June 10, 1941.  W. E. DEWEY  2,245,186

GRASS CUTTER

Filed Aug. 5, 1939

Inventor.
W. E. Dewey
By Arthur H. Sturges
Attorney

Patented June 10, 1941

2,245,186

UNITED STATES PATENT OFFICE 2,245,186

GRASS CUTTER

Wilbur E. Dewey, Omaha, Nebr.

Application August 5, 1939, Serial No. 288,602

4 Claims. (Cl. 56—25)

This invention relates to the grass cutting art and has for an object to provide a grass mower mechanism and driving means so constructed that it may be readily attached to and removed from an automobile of conventional type and more particularly to provide means for disposing said mower in an operative position approximately mid-way between the front and rear wheels of and in combination with an automobile and beyond one side of the latter whereby a more advantageous resultant is obtained than heretofore.

Another object of the invention is to provide a sickle bar mower combined with an automobile in such a way that such sickle may be seen from the driver's seat of said automobile during operation.

Other and further objects and advantages of the invention will be understood from the following detailed description thereof, reference being had to the accompanying drawing in which.

Figure 1:
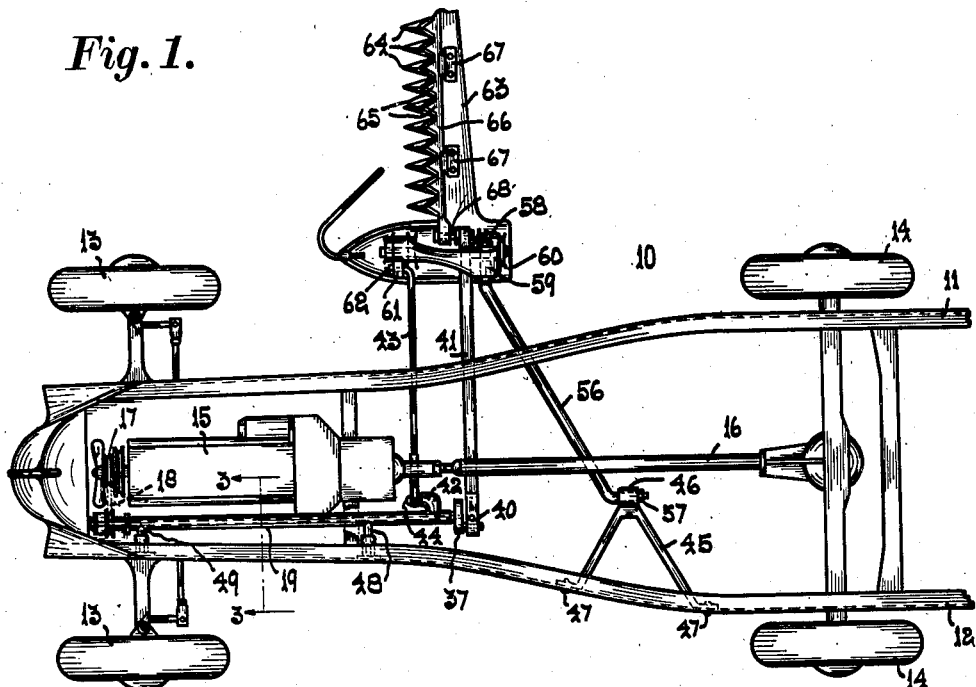
Figure 1 is a top plan view of the chassis of an automobile and depicting an embodiment of the present invention, certain portions thereof being broken away.

As heretofore practiced in the art mowing devices have been disposed at the front ends of land vehicles in a manner whereby the sickle bar thereof extend beyond said front ends which has necessitated complicated mechanisms and having the further disadvantage of causing the sickle bar to follow the undulations of the surface of the ground, resultant from the front wheels of the vehicle dipping into depressions of the ground during forward travel of the vehicle in a manner whereby the upper ends of cut grasses are uneven resultant from said sickle bars following said undulations. Also during operation a sickle bar so disposed cannot be visualized from the driver's seat of an automobile, and the present invention aims to obviate said undesirable prior practices.

Referring now to the drawing for a more particular description 10 indicates generally the chassis of an automobile provided with oppositely disposed side rails 11 and 12, front wheels 13, rear wheels 14 and an internal combustion engine 15 for causing the vehicle to travel forwardly over the ground in a well known manner, the power of said engine being communicated to the rear wheels 14 through a propeller shaft 16.

The conventional grooved pulley wheel mounted axially on the crank shaft of said engine for driving a fan belt employed for cooling the engine is discarded in the practice of the present invention, and a pulley wheel 17 substituted therefor which is provided with a groove for driving said fan belt and also with an adjacent annularly grooved portion for driving a belt 18, the latter being represented by dotted lines in Figure 1.

Figure 2:
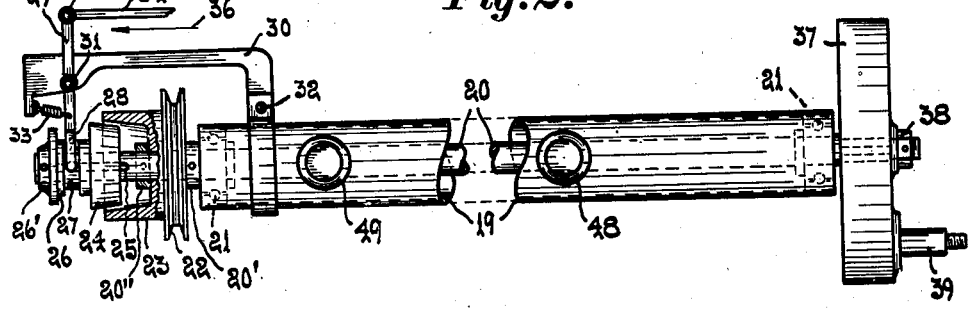
Figure 2 is a side elevation of certain driving mechanism employed, certain portions thereof being broken away and in section.
Figure 3:
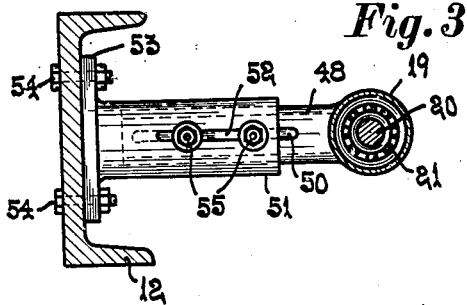
Figure 3 is a transverse section of a side rail of said chassis and showing an extensible support for said driving mechanism secured thereto, the view being taken substantially on line 3—3 of Figure 1.

As best shown in Figure 2, the invention further includes an elongated shaft housing 19 and a later described means is provided for causing the shaft 20 within said housing 19 to be maintained during operation in parallelism with the crank shaft of the engine 15. At each end of the housing 19 a ball bearing 21 is provided for the shaft 20, as shown in Figure 3.

The shaft 20 extends beyond and through each end of the housing 19 and that end thereof adjacent the radiator of the automobile is provided with a grooved pulley wheel 22 which is idly mounted on the shaft 20 between two stop collars 20' and 20". The idler pulley 22 is driven by the heretofore mentioned belt 18 for causing rotary movements to be imparted to the shaft 20 at desired times through a clutch mechanism employed as later described.

The forward face of the pulley 22 is provided with a drum portion 23 having a tapered annular recess. A cone 24 is axially disposed about the shaft 20 and longitudinally slidable with respect thereto, said shaft being provided with a key or spline 25 whereby at times when the cone 24 is rotated the shaft 20 is provided with corresponding movements.

The cone 24 is provided with a hub 26 having an annular recess 27 which is rectangular in cross section and within said recess oppositely disposed ends 28 of a bifurcated lever 29 are received. A stop detent 26' is secured on the end of the shaft 20 adjacent to the sleeve 26 for preventing said sleeve from sliding off of the shaft 20.

Between the ends of the lever 29 a support 30 is provided, said lever being pivotally secured to said support as at 31. The support 30 includes a main body portion which encircles the housing 19 having an ear formed at the end thereof through which a draw bolt 32 extends, said bolt also extending through the main body portion of the support, whereby at times when the nut on the bolt 32 is turned up said ear becomes drawn towards said main body portion for adjustably clamping the support 30 to the housing 19.

A spring 33 having opposite ends respectively secured to the support 30 and to the lever 29 is employed for normally urging the cone 24 away from the drum 23 and a push rod 34 is pivotally attached to an end of the lever 29 as at 35. The rod 34 may extend to any suitable convenient portion of the automobile and preferably extends through the dashboard thereof having an end adjacent the steering wheel of the vehicle whereby at times when the operator moves the rod 34 in the direction of the arrow 36 the cone is caused to move into engagement with the drum 23 for causing the belt 18 to rotate the pulley 22 and the shaft 20 through the cone 24.

A rear end of the shaft 20 carries a fly wheel 37, said end being threaded and provided with a nut 38 for locking the fly wheel to said shaft.

The fly wheel is provided with a crank-pin 39 which receives a collar 40 disposed at one end of a pitman rod 41. As best shown in Figure 1 the housing 19 is provided with an outstanding arm 42 to which one end of a reach-rod-support 43 is pivotally secured as at 44.

A V-shaped support 45 provided with a bearing block 46 is employed, the axis of the latter being disposed in alignment with the axis of the pivot 44 for the reach rod 43 and during operation said alignment is parallel with the crank shaft of the engine 13 as later described. The ends of the legs of the V-shaped support are secured to the frame rail 12 of the chassis by means of bolts or the rivets 47 as shown in Figure 1.

The housing 19 is provided with two spaced apart aligned arms 48 and 49 which are preferably circular in plan as shown in Figure 2. As best shown in Figure 3, the arm 48 is provided with oppositely disposed elongated slots 50 and said arm is slidably disposed in a socket 51, the latter being provided with elongated slots 52 and a foot 53. The foot 53 is secured to the frame rail 12 by means of suitable bolts 54. One or more detent bolts 55 extend through the slots 50 and 52 whereby at times when the nuts of the bolts 55 are tightened the housing 19 is thereby disposed a selected distance away from or towards the frame rail 12.

The forward arm 49 is similarly provided with a socket, foot, slots and bolts and as thus described it will be understood that the shaft 19 may be accurately disposed in parallelism with the crank shaft of the engine 15.

If desired the sockets for the arms 48 and 49 may extend downwardly as well as towards the engine 15 whereby the shaft 20 is disposed lower than the propeller shaft 16.

In use the sockets 51 for the arms 48 and 49 may, if desired, be secured to the rail 12 by means of rivets in lieu of the heretofore mentioned bolts 54 and the support 45 also permanently secured to said frame whereby at times when it is desired to detach the housing 19 and adjunct parts it is only necessary to withdraw the heretofore mentioned bolts 55, said sockets 51 remaining secured to the frame rail 12.

A stay brace rod 56 is provided with an offset end which extends through the bearing block 46, being removably secured thereto by means of a threaded nut 57, the other end of said rod 56 being also offset and provided with a threaded nut 58 at the outer end thereof, said outer end extending through a boss 59 the latter being integral with the shoe 60 of the mower mechanism.

The boss 59 extends forwardly of the shoe 60 and is provided with an ear 61 to which the heretofore mentioned reach rod support 43 is pivotally attached as at 62.

As thus described it will be understood that the shoe 60 is free to have vertical swinging movements with respect to its pivotal point 44 and the axis of the bearing block 46, the rods 56 and 43 preventing the shoe from moving either towards the front or rear wheels of the automobile for causing the pitman rod 41 to be maintained at a right angle with respect to the longitudinal length of the automobile while the shoe 60 is operatively supported outwardly and beyond the outer side of the wheels 14 and 13.

The shoe 60 is provided with an elongated arm 63 having spaced apart teeth 64 upon the forward edge thereof which cooperate with the teeth 65 carried by a reciprocatable sickle bar 66, the latter being provided with guides 67 and a pin 68 disposed at that end thereof which is adjacent to the shoe 60. The pin 68 is pivotally connected to the outer end of the pitman rod 41 as shown in Figure 1.

At times when the engine 15 is operating the push rod 34 may be moved for causing the power of the engine to reciprocate the sickle bar 66 through the pitman rod 41, crank pin 39 of the fly wheel, crank throw 37, the shaft 20 and the clutch mechanism disposed at the forward end of the said shaft, the driver belt 18 and the pulley 17 disposed on the forward end of the crank shaft of the engine.

As thus described it will be noted that at all times during forward travel of the automobile as well as at times when the vehicle is standing still or but slightly moving forwardly the sickle bar 66 may be caused to reciprocate for cutting grass as desired by the operator.

Among other advantages of disposing the sickle bar midway between the front and rear wheels of the automobile is that the upper ends of the blades of grass which extend from depressions in the ground are cut off level with respect to the upper ends of blades of grass which extend from convexed ground surfaces whereby standing cut grass is provided with an even appearance which is of advantage when treating fairways of golf courses and the like. Also the driver may see the sickle-bar at work advantageously while driving the automobile whereby grass cutting operations are facilitated generally and while turning corners in particular.

From the foregoing description it is thought to be obvious that a grass cutter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:

1. In combination with an automobile provided with front and rear wheels, an internal combustion engine, a shaft housing disposed in approximate parallelism with the crank-shaft of said engine, a shaft in said housing, a driven connection between said crank-shaft and shaft for driving the latter independently of the transmission of the automobile, a clutch for regulating said driving disposed at one end of said shaft, a crank throw at the other end of said shaft, a grass cutter mechanism having a sickle-bar and a shoe disposed between said front and rear wheels and beyond an outer side of the latter, a pitman rod connection between said sickle-bar and crank throw for reciprocating said sickle-bar, a reach-rod disposed between said pitman-rod and said front wheels having ends respectively pivotally connected to said housing and shoe, a support carried by the frame of said automobile between said pitman-rod and said rear wheels, a stay brace rod having ends respectively pivotally connected to said support and shoe, and means for removably securing said housing to the frame of said automobile.

2. In a grass cutter, an automobile provided with front and rear wheels, a mower sickle bar disposed between said front and rear wheels and beyond one side of the latter, means including a shaft driven by the crank-shaft of the engine of said automobile having a driver connection with said sickle for actuating the latter, means for supporting said shaft in parallelism with said crank-shaft during said actuation, said supporting means comprising a housing for said shaft, a pair of spaced apart sockets secured to a frame rail of said automobile, arms disposed outwardly from said housing between the ends of the latter, said arms having a slidable connection with said sockets, and detent means for locking said arms in a selected position with respect to said sockets for maintaining either end of said shaft a selected distance away from said rail.

3. In a grass cutter, an automobile provided with front and rear wheels, a sickle-bar mower disposed approximately midway between said front and rear wheels and beyond one side of the latter, a pivotal connection between said automobile and mower for permitting the latter to have vertically swinging movements, driving means connected to and disposed between the crank-shaft of the engine of said automobile and said sickle-bar for reciprocating the latter, said means being connected to said crank-shaft independently of the transmission of the automobile and clutch means for governing said reciprocation.

4. In a grass cutter an automobile having front and rear wheels, an engine provided with a crank-shaft, a driven shaft carried by the frame of the automobile, a pulley wheel freely mounted on said driven shaft, a clutch having one member carried by said pulley and the other member keyed to said driven shaft, a pulley wheel mounted on the crank-shaft and driven thereby, a belt trained over said pulley wheels for establishing a direct drive between the crank-shaft and the driven shaft when the clutch members are engaged, and a sickle bar mower mounted on the automobile between said front and rear wheels and operated by the driven shaft.

WILBUR E. DEWEY.